(12) United States Patent
Kamijima (10) Patent No.: US 9,092,127 B2
(45) Date of Patent: *Jul. 28, 2015

(54) TERMINAL DEVICE AND CONTROL PROGRAM THEREOF

(75) Inventor: Atsuhiko Kamijima, Kanagawa (JP)

(73) Assignee: NEC CASIO MOBILE COMMUNICATIONS, LTD., Kanagawa (JP)

( * ) Notice: Subject to any disclaimer, the term of this patent is extended or adjusted under 35 U.S.C. 154(b) by 1020 days.

This patent is subject to a terminal disclaimer.

(21) Appl. No.: 13/041,561

(22) Filed: Mar. 7, 2011

(65) Prior Publication Data

US 2011/0234515 A1    Sep. 29, 2011

(30) Foreign Application Priority Data

Mar. 25, 2010    (JP) .................. 2010-069927

(51) Int. Cl.
*G06F 3/041* (2006.01)
*G06F 3/0485* (2013.01)
(Continued)

(52) U.S. Cl.
CPC ............ *G06F 3/0485* (2013.01); *G06F 3/0481* (2013.01); *G06F 3/04883* (2013.01); *G09G 5/14* (2013.01); *G09G 5/34* (2013.01); *G09G 2354/00* (2013.01); *H04M 2250/16* (2013.01)

(58) Field of Classification Search
CPC ......... G06F 3/033; G06F 3/041; G06F 3/048; G06F 17/00; G06F 3/0481; G06F 3/0485; G06F 3/04883; G09G 5/14; G09G 2354/00; G09G 5/34; H04M 2250/16; H04M 2242/00; H04M 2242/26

USPC .......... 345/156–184, 901, 107; 715/863, 766, 715/730, 732, 761, 778, 784, 830, 833
See application file for complete search history.

(56) References Cited

U.S. PATENT DOCUMENTS

| 6,545,669 | B1 | 4/2003 | Kinawi et al. |
| 7,479,948 | B2 | 1/2009 | Kim et al. |

(Continued)

FOREIGN PATENT DOCUMENTS

| CN | 201233589 Y | 5/2009 |
| CN | 201266371 Y | 7/2009 |

(Continued)

OTHER PUBLICATIONS

Communication, dated Sep. 13, 2013, issued by the Japanese Patent Office in counterpart Japanese Patent Application No. 2010-069927.

(Continued)

*Primary Examiner* — Grant Sitta
*Assistant Examiner* — Amen Bogale
(74) *Attorney, Agent, or Firm* — Sughrue Mion, PLLC (57) ABSTRACT

In a terminal device 10, when a slide operation performed on at least either of a plurality of touch screens TD1 and TD2 is detected, a control section 1 performs display control based on a judgment result indicating whether or not another screen is present in the sliding direction. For example, when another screen is not present in the sliding direction, the control section 1 instructs the screens to perform page turning by an amount equivalent to a single screen, or when another screen is present, the control section 1 instructs the screens to perform page turning by a number of pages calculated by the number of screens present in the sliding direction being added to the number of the operation screen.

6 Claims, 9 Drawing Sheets

(51) Int. Cl.
  *G06F 3/0481*  (2013.01)
  *G06F 3/0488*  (2013.01)
  *G09G 5/14*    (2006.01)
  *G09G 5/34*    (2006.01)

(56) References Cited

U.S. PATENT DOCUMENTS

| | | |
|---|---|---|
| 7,487,469 B2 | 2/2009 | Toriyama et al. |
| 2007/0083828 A1* | 4/2007 | Toriyama et al. ............ 715/816 |
| 2007/0247441 A1 | 10/2007 | Kim et al. |
| 2008/0040692 A1 | 2/2008 | Sunday et al. |
| 2009/0066668 A1 | 3/2009 | Kim et al. |
| 2009/0267909 A1 | 10/2009 | Chen et al. |
| 2009/0322689 A1 | 12/2009 | Kwong et al. |
| 2010/0066643 A1 | 3/2010 | King et al. |
| 2010/0085382 A1* | 4/2010 | Lundqvist et al. ............ 345/659 |
| 2010/0175018 A1* | 7/2010 | Petschnigg et al. ............ 715/776 |
| 2011/0167380 A1* | 7/2011 | Stallings et al. ............ 715/784 |

FOREIGN PATENT DOCUMENTS

| | | |
|---|---|---|
| EP | 1 217 508 A1 | 6/2002 |
| JP | 7-28791 A | 1/1995 |
| JP | 8-76926 A | 3/1996 |
| JP | 2007-293820 A | 11/2007 |
| JP | 2008-217647 A | 9/2008 |

OTHER PUBLICATIONS

Extended European Search Report, dated May 17, 2013, issued by the European Patent Office in counterpart European Patent Application No. 11156944.8.

Communication dated Mar. 13, 2015, from the State Intellectual Property Office of the People's Republic of China in counterpart Chinese Application No. 201110079074.5.

Communication dated Jul. 3, 2014, from the State Intellectual Property Office of the People's Republic of China in counterpart Chinese Application No. 201110079074.5.

* cited by examiner

HORIZONTALLY ORIENTED

OPERATION TABLE

| TYPE OF OPERATION | | TERMINAL STATE | DISPLAY CONTROL |
|---|---|---|---|
| SINGLE TOUCH | ANOTHER SCREEN NOT PRESENT IN SLIDING DIRECTION | HORIZONTALLY ORIENTED | TURN PAGE IN SLIDING DIRECTION BY AMOUNT EQUIVALENT TO SINGLE SCREEN |
| | | VERTICALLY ORIENTED | |
| | ANOTHER SCREEN PRESENT IN SLIDING DIRECTION | HORIZONTALLY ORIENTED | TURN PAGE IN SLIDING DIRECTION BY AMOUNT EQUIVALENT TO NUMBER OF OTHER SCREENS PLUS SINGLE SCREEN |
| | | VERTICALLY ORIENTED | |
| MULTI-TOUCH | ANOTHER SCREEN NOT PRESENT IN SLIDING DIRECTION | HORIZONTALLY ORIENTED | AUTOMATICALLY TURN PAGE IN SLIDING DIRECTION IN UNITS OF AMOUNT EQUIVALENT TO SINGLE SCREEN |
| | | VERTICALLY ORIENTED | |
| | ANOTHER SCREEN PRESENT IN SLIDING DIRECTION | HORIZONTALLY ORIENTED | AUTOMATICALLY TURN PAGE IN SLIDING DIRECTION IN UNITS OF AMOUNT EQUIVALENT TO NUMBER OF OTHER SCREENS PLUS SINGLE SCREEN |
| | | VERTICALLY ORIENTED | |

VERTICALLY ORIENTED
(HORIZONTALLY ALIGNED)

FIG. 9B

HORIZONTALLY ORIENTED
(VERTICALLY ALIGNED)

FIG. 9C

VERTICALLY ORIENTED
(HORIZONTALLY ALIGNED)

FIG. 9D

HORIZONTALLY ORIENTED
(VERTICALLY ALIGNED)

TERMINAL DEVICE AND CONTROL PROGRAM THEREOF

CROSS-REFERENCE TO RELATED APPLICATION

This application is based upon and claims the benefit of priority from the prior Japanese Patent Application No. 2010-069927, filed Mar. 25, 2010, the entire contents of which is incorporated herein by reference.

BACKGROUND OF THE INVENTION

1. Field of the Invention

The present invention relates to a terminal device having a plurality of screens and a control program thereof.

2. Description of the Related Art

In recent years, terminal devices such as mobile phones have become increasingly sophisticated, and the increase of screen size through the equipment of a plurality of display sections has been actualized along with it. As a technology for increasing the screen size through the equipment of a plurality of display sections such as this, for example, a terminal device is conventionally known in which the display contents of a plurality screens displaying information such as text and images are switched and displayed in response to a forward scrolling operation or a backward scrolling operation on the screens (refer to, for example, Japanese Patent Application Laid-Open (Kokai) Publication No. 2008-217647).

However, in the above-described conventional technology, there is a problem in that the area of the screen becomes small because various controllers are required for scrolling the screen. Therefore, a technology has been conceived in which a touch screen structured by a transparent touch-panel being layered on the surface of a screen is provided. This technology does not require controllers for scrolling a screen and allows an intuitive operation, wherefore it is now widely used in terminal devices. However, this technology too has problems. Firstly, a scrolling operation is required to be performed for each screen, which is bothersome. Secondly, in a case where information amounting to a plurality of pages is being displayed in a manner that these pages are assigned to a plurality of screens, respectively, if the user performs a scrolling operation on one screen and forgets to perform it on another screen, continuity of the pages is no longer maintained among the screens.

The present invention has been conceived to solve the above-described problems. An object of the present invention is to provide a terminal device actualizing a suitable display control of a plurality of screens through simple and intuitive operations.

SUMMARY OF THE INVENTION

In accordance with one aspect of the present invention, there is provided a terminal device having a plurality of screens, comprising: a slide operation detection means for detecting a slide operation performed on each of the plurality of screens; a judgment means for judging whether or not another screen is present in a sliding direction when the slide operation is detected by the slide operation detection means; and a display control means for performing different display control on the plurality of screens based on a judgment result from the judgment means.

In accordance with another aspect of the present invention, there is provided a non-transitory computer-readable storage medium having stored thereon a program that is executable by a computer, the program being executable by the computer to perform a process comprising: processing for detecting a slide operation performed on each of a plurality of screens; processing for judging whether or not another screen is present in the sliding direction when a slide operation is detected; and processing for performing different display control on the plurality of screens based on the judgment result.

According to the present invention, a suitable display control of a plurality of screens through simple and intuitive operations can be actualized, and therefore it is practically useful.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a flowchart showing an overview of the overall operations of the terminal device 10 which are initiated when its power is turned ON;

DETAILED DESCRIPTION OF THE PREFERRED EMBODIMENTS

The present invention will hereinafter be described in detail with reference to the preferred embodiments shown in the accompanying drawings.

Figure 1:
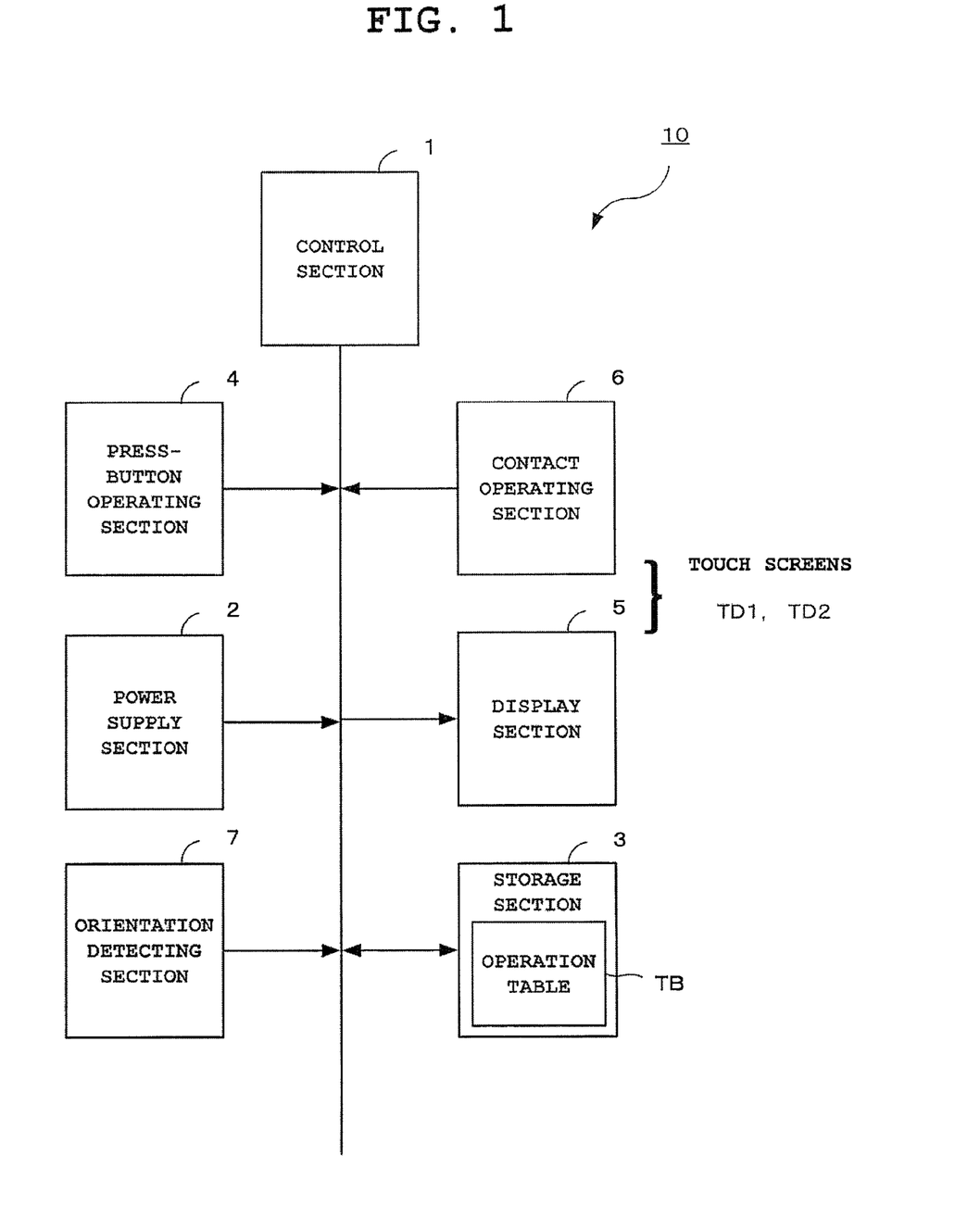
FIG. 1 is a block diagram showing the basic components of a terminal device 10.

FIG. 1 is a block diagram showing the basic components of the terminal device 10.

The terminal device 10 has a structure such as shown in FIG. 1, which is, for example, a foldable type terminal device (such as a mobile phone) whose two rectangular casings are foldably attached, and has a plurality of screens. A control section 1, which operates by receiving power supply from a power supply section 2 including a secondary battery or the like, controls the overall operations of the terminal device 10 in accordance with various programs in a storage section 3.

This control section 1 is provided with a central processing unit (CPU), a memory, and the like (not shown). The storage section 3 is an internal memory such as a read-only memory (ROM) or a random access memory (RAM), and has a program area and a data area (not shown). In the program area of the storage section 3, programs for actualizing the present embodiment based on operation procedures shown in FIG. 6, described hereafter, are stored.

Here, the control section 1 actualizes functions of a slide operation detection means, a judgment means, and a display control means.

In the data area of the storage section 3, various flag information, various information required to operate the terminal device 10, and an operation table TB described hereafter are stored. Note that the storage section 3 may be, for example, structured to include a detachable portable memory (recording media) such as a secure digital (SD) card or an integrated circuit (IC) card. Alternatively, the storage section 3 may be structured to be provided on a predetermined external server (not shown). A press-button operating section 4 has various press-button-type keys used to dial a number, enter text, enter a command, and the like, and the control section 1 performs various types of processing based on operation signals sent from this press-button operating section 4.

A display section 5 including high-definition liquid crystal or organic electroluminescent display displays an idling screen, icons, date and time information, text data, etc., and a touch screen is structured by a contact operating section (a transparent contact sensor or a touch panel) 6 that detects finger contact being layered on the surface of this display section 5. In the embodiment, two physically-separated independent display sections 5 are provided, and two independent touch screens TD1 and TD2 are structured by the contact operating section 6 being layered on substantially the entire surface of each display section 5. When a contact operation (touch operation) is performed on the touch screens TD1 and TD2, the contact operating section 6 provides the control section 1 with a detection result of the touch operation. This touch operation may be detected using a capacitance method or a resistive film method. Also, it may be detected using a piezoelectric method that enables the detection of pressing (pressure) by an operating instrument or a finger, in addition to contact. In the embodiment, the capacitance method, which detects human contact, is used.

An orientation detecting section 7 includes, for example, a three-axis acceleration sensor, and detects whether a rectangular terminal casing is oriented to be vertically long (vertically oriented) or horizontally long (horizontally oriented), based on the angle of the terminal casing relative to the direction of gravitational force and vibrations. That is, the orientation detecting section 7 detects whether the overall rectangular terminal casing is in a vertically oriented state where it is oriented to be vertically long or in a horizontally oriented state where it is oriented to be horizontally long, and the control section 1 changes display state so that display contents on the touch screens TD1 and TD2 are displayed in accordance with the orientation of the terminal casing, based on the detection result.

Figure 2A:
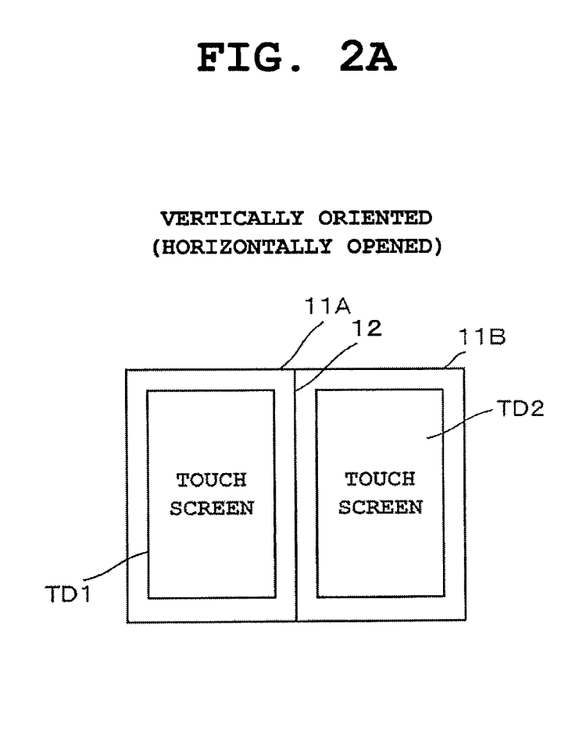
FIG. 2A and FIG. 2B are outer appearance views of two casings 11A and 11B in an opened state.
Figure 2B:
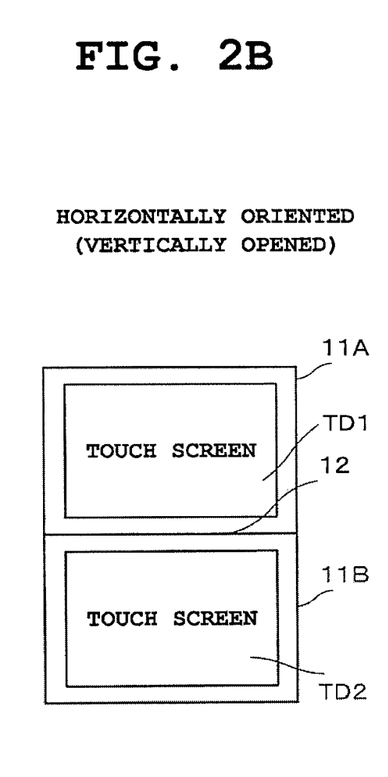

FIG. 2A and FIG. 2B are outer appearance views of two casings 11A and 11B in an opened state.

The two rectangular casings 11A and 11B are foldably (openably and closably) connected by a hinge section 12, and the touch screens TD1 and TD2 of the same shape and size (rectangular) are arranged on substantially the entire area on the inner surface side of the casings 11A and 11B, respectively. FIG. 2A shows a state in which the two rectangular casings 11A and 11B are opened to be horizontally aligned (horizontally opened state), or in other words, a state in which the two rectangular casings 11A and 11B are vertically oriented such that the overall terminal casing is horizontally long. In this vertically oriented state (horizontally opened state), the two touch screens TD1 and TD2 are in a horizontally aligned state (horizontally opened state) near each other (side-by-side). In this instance, as shown in FIG. 2A, an arrangement state is formed in which the touch screen TD1 is positioned on the left side and the touch screen TD2 is positioned on the right side.

FIG. 2B shows a state in which the overall terminal casing is rotated by 90 degrees from the state shown in FIG. 2A, and the two horizontally long casings 11A and 11B are opened to be vertically aligned (vertically opened state), or in other words, a state in which the two rectangular casings 11A and 11B are horizontally oriented such that the overall terminal casing is vertically long. In the horizontally oriented state (vertically opened state), the two touch screens TD1 and TD2 are in a vertically aligned state (vertically opened state) near each other (side-by-side). In this instance, as shown in FIG. 2B, an arrangement state is formed in which the touch screen TD1 is positioned on the upper side and the touch screen TD2 is positioned on the lower side.

FIG. 3A to FIG. 3E are diagrams for explaining display control that are, when a touch operation (slide operation) is performed on the touch screens TD1 and TD2 with display information amounting to a plurality of pages being assigned and displayed in page sequence on the two touch screens TD1 and TD2 in the horizontally opened state (vertically oriented state), performed in response to this slide operation. The display control shown in FIG. 3A to FIG. 3E correspond to some of the stored contents in the operation table TB (described hereafter) that stores various display control performed in response to slide operations performed on the touch screens TD1 and TD2. Although the touch screens TD1 and TD2 are slightly separated from each other as shown in FIG. 2A and FIG. 2B, they are shown adjacent to each other in FIG. 3A to FIG. 3E for simplicity.

Figures 3A, 3B:
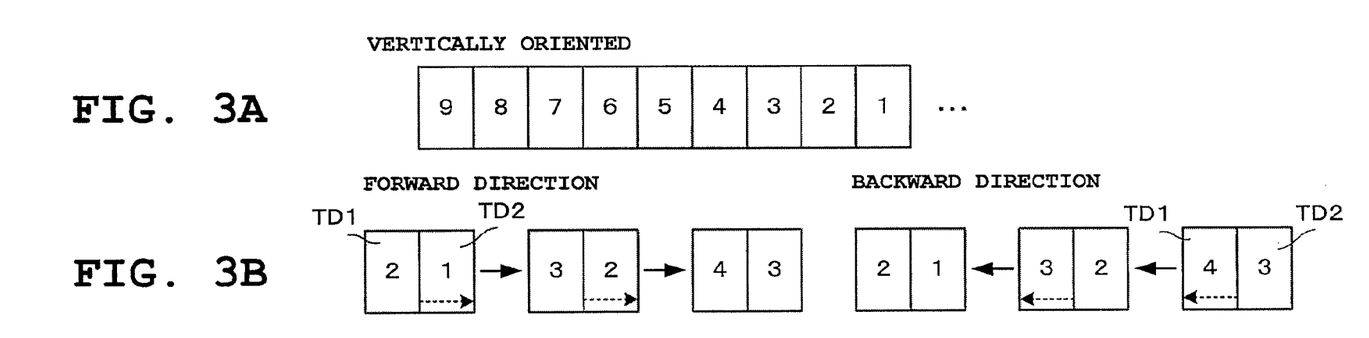
FIG. 3A to FIG. 3E are diagrams for explaining display control performed in response to slide operations when a slide operation is performed on two touch screens TD1 and TD2 in a horizontally opened state (vertically held state)

FIG. 3A shows display information (text, images, and the like) amounting to a plurality of pages, and the numerals in the drawing indicate the page numbers starting from "1". Here, the slide operation refers to, if it is performed by human contact, an operation in which a finger moves on either of the touch screens TD1 and TD2 while being in contact therewith. This slide operation is differentiated from a touch operation in which a finger simply comes into contact with the touch screens TD1 and TD2. The types of slide operation include a slide operation performed from the touch screen TD1 toward the touch screen TD2 (from left to right in the drawings) (forward scrolling operation), and a slide operation performed from the touch screen TD2 toward the touch screen TD1 (right to left in the drawings) (backward scrolling operation). In addition, there are also a multiple slide operation performed using two fingers simultaneously (multi-touch slide operation) and a single slide operation performed using one finger (single touch slide operation).

When a slide operation performed on the touch screen TD1 or the touch screen TD2 is detected, the control section 1 identifies the touch screen on which the slide operation has been performed as an operation screen, and judges whether or not another screen is present in the sliding direction from the operation screen. Then, the control section 1 performs different display control on the touch screens (two screens according to the embodiment) depending on the judgment result. That is, when a slide operation is performed with display information amounting to a plurality of pages being assigned and displayed in page sequence on the touch screens TD1 and TD2, and if another screen is not present in the sliding direction from the operation screen, the control section 1 performs display control instructing the touch screens TD1 and TD2 to perform page turning by an amount equivalent to a single screen (described in detail hereafter with reference to FIG. 3B).

Figure 3C:
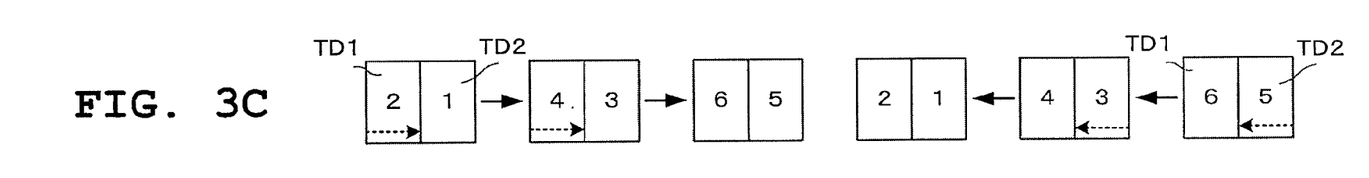

Conversely, if another screen is present in the sliding direction from the operation screen, the control section 1 performs display control instructing the touch screens TD1 and TD2 to perform page turning by a number of pages calculated by the number of other screens present in the sliding direction being added to the number of the operation screen (the number of other screens+1) (described in detail hereafter with reference to FIG. 3C). Also, when a plurality of slide operations are performed simultaneously (multi-touch operation), the control section 1 repeatedly and continuously performs display control by a number of times corresponding to the number of slide operations at predetermined time intervals (described in detail hereafter with reference to FIG. 3D and FIG. 3E).

Figure 3D:
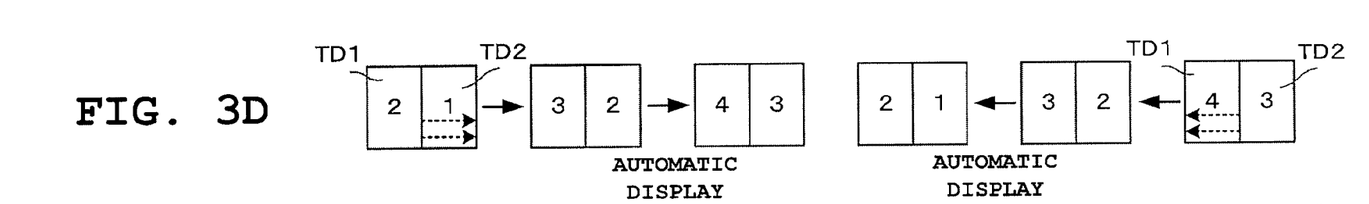
Figure 3E:
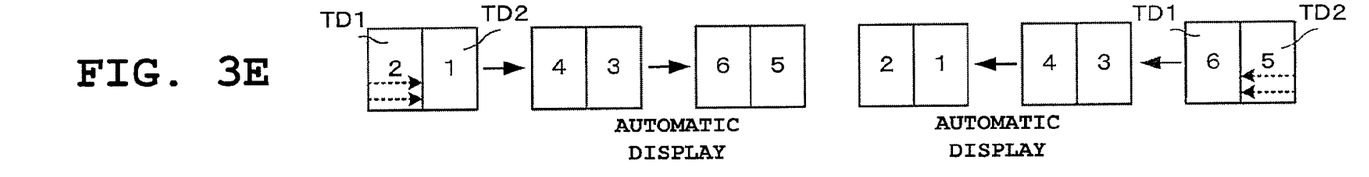

FIGS. 3D and 3E show display control performed in this case. FIG. 3D shows display control performed when another screen is not present in the sliding direction from the operation screen, as in the case of the above-described FIG. 3B. FIG. 3E shows display control performed when another screen is present in the sliding direction from the operation screen, as in the case of the above-described FIG. 3C. A multi-touch operation such as this is used, for example, to automatically and sequentially switch and display a plurality of images in slide-show format at five-second intervals, and to automatically and sequentially switch and display text information on each page of an electronic book at a time interval (such as 5 minutes) discretionarily set in advance.

FIG. 4A to FIG. 4E are diagrams for explaining display control performed in the vertically opened state (horizontally oriented state), whereas FIG. 3A to FIG. 3E are diagrams for explaining display control performed in the horizontally opened state (vertically oriented state). That is, FIG. 4A to FIG. 4E are diagrams for explaining display control that are, when a slide operation (slide operation in the up-down direction in the drawings) is performed on the touch screens TD1 and TD2 with display information amounting to a plurality of pages being assigned and displayed in page sequence on the two touch screens TD1 and TD2, performed in response to this slide operation. The display control shown in FIG. 4A to FIG. 4E correspond to some of the stored contents in the operation table TB. Note that, although the display control performed in the vertically opened state (horizontally oriented state) are basically similar to the display control performed in the horizontally opened state (vertically oriented state), operations in the forward direction indicate slide operations from up to down, and operations in the backward direction indicate slide operations from down to up.

Figure 4A:
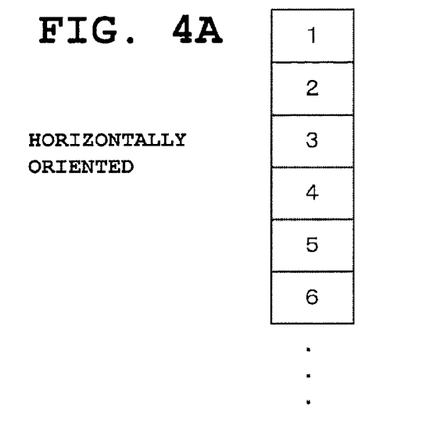
FIG. 4A to FIG. 4E are diagrams for explaining display control performed in response to slide operations when a slide operation is performed on the two touch screens TD1 and TD2 in a vertically opened state (horizontally held state)
Figure 4B:
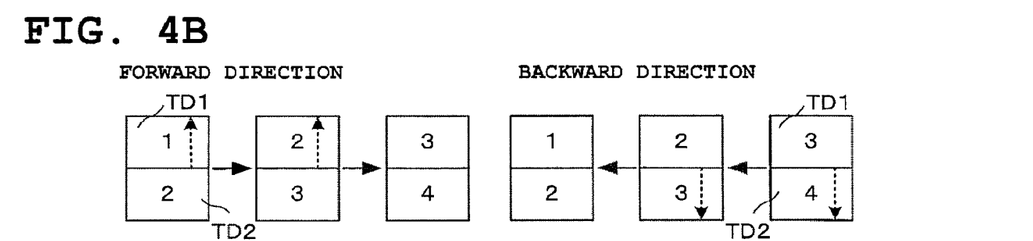
Figure 4C:
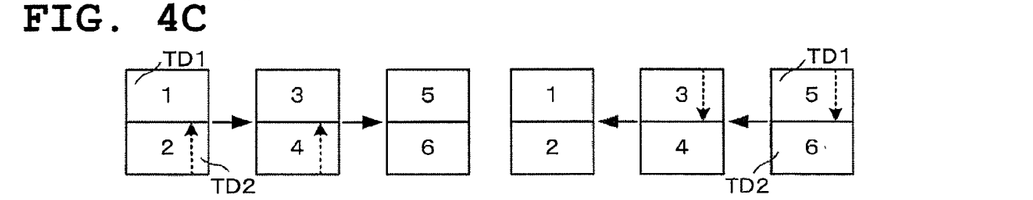
Figure 4D:
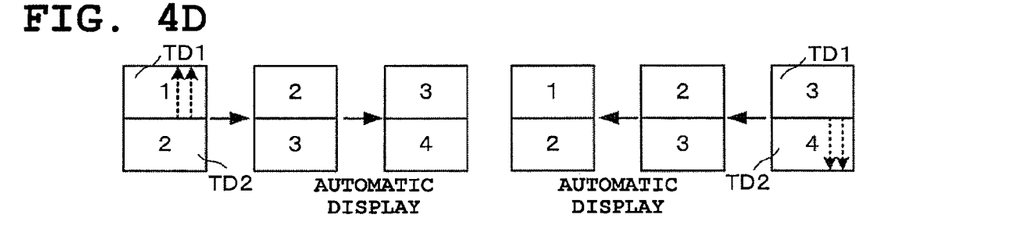
Figure 4E:
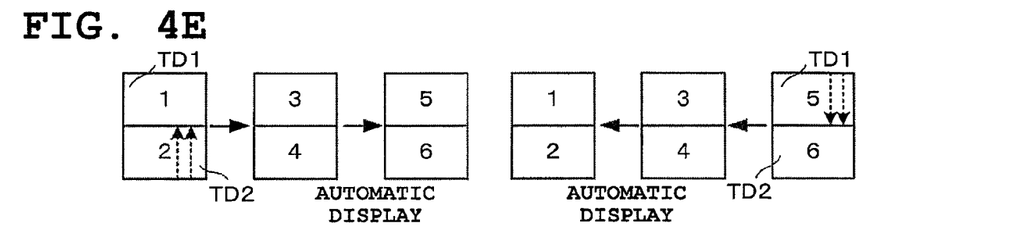

FIG. 4A shows display information (text, images, etc.) amounting to a plurality of pages, as in the case of the above-described FIG. 3A, FIG. 4B is a diagram for explaining display control corresponding to that in the above-described FIG. 3B. As shown in FIG. 4B, when another screen is not present in the sliding direction from the operation screen, display control instructing the touch screens TD1 and TD2 to perform page turning by an amount equivalent to a single screen is performed. FIG. 4C is a diagram for explaining display control corresponding to that in the above-described FIG. 3C. As shown in FIG. 4C, when another screen is present in the sliding direction from the operation screen, display control instructing the touch screens TD1 and TD2 to perform page turning by a number of pages calculated by the number of other screens present in the sliding direction being added to the number of the operation screen (the number of other screens+1) is performed. FIG. 4D and FIG. 4E are diagrams for explaining display control corresponding to those in the above-described FIG. 3D and FIG. 3E. As shown in FIG. 4D and FIG. 4E, when a plurality of slide operations are simultaneously performed (multi-touch operation), display control is repeatedly and continuously performed by a number of times corresponding to the number of slide operations at predetermined time intervals.

Figure 5:
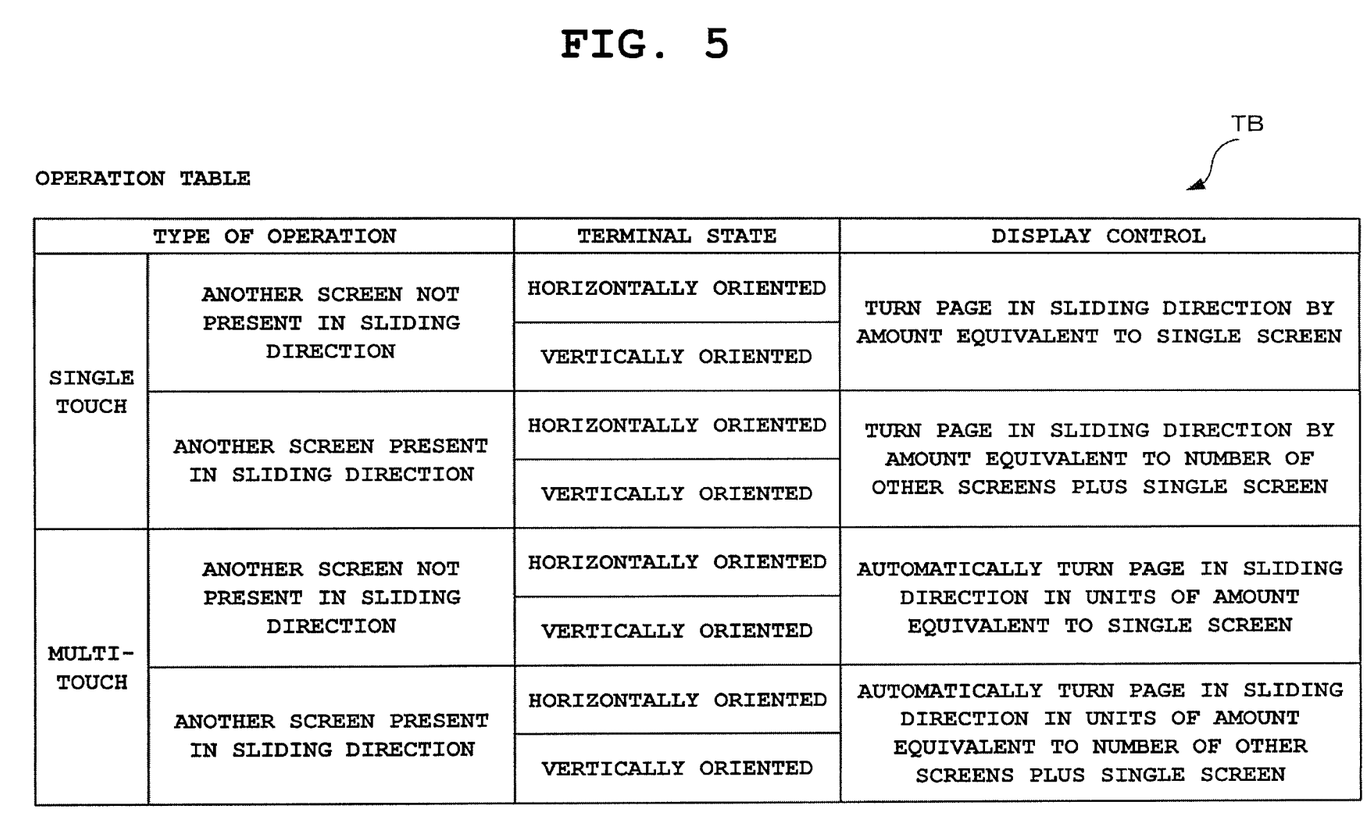
FIG. 5 is a diagram for explaining an operation table TB.

FIG. 5 is a diagram for explaining the operation table TB.

The operation table TB is configured to associate and store "type of operation" indicating the type of performed slide operation, "terminal orientation" indicating the orientation of the terminal device 10 detected by the orientation detecting section 7, and "display control" indicating the details of display control performed in response to a slide operation. "Type of operation" is broadly classified into a single slide operation (slide touch) field and a plurality of simultaneous slide operations (multi-touch) field. "Single touch" and "multi-touch" are further divided into "another screen not present in sliding direction" and "another screen present in sliding direction". Each field under "type of operation" is further divided into "horizontally oriented" and "vertically oriented" under "terminal orientation", and "display control" is stored in association with each of these divided fields. Note that the details of "display control" are basically similar regardless of whether "terminal orientation" is "horizontally oriented" or "vertically oriented".

Next, the operation concept of the terminal device 10 according to the embodiment will be described with reference to the flowchart shown in FIG. 6. Here, each function described in the flowchart is stored in readable program code format, and operations based on these program codes are sequentially performed. Operations based on the above-described program codes transmitted over a transmission medium such as a network can also be sequentially performed. That is, the unique operations of the embodiment can be performed using program and data supplied from an outside source over a transmission medium, in addition to a recording medium.

Figure 6:
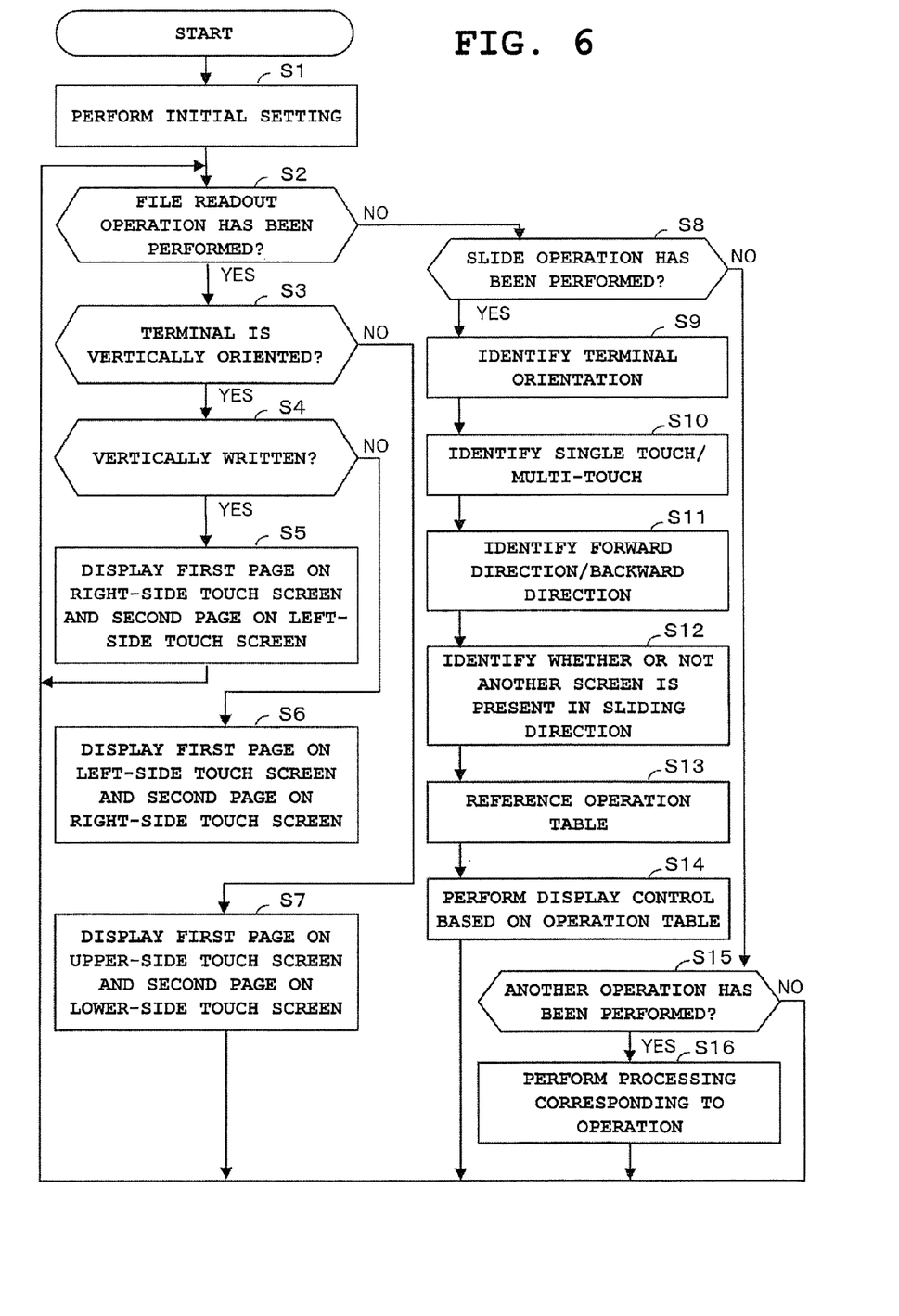

FIG. 6 is a flowchart showing an overview of the overall operations of the terminal device 10 which are initiated when its power is turned ON.

First, the control section 1 performs an initial setting for resetting a memory and the like upon power being turned ON (Step S1), and then judges whether or not a file readout operation for reading out and displaying an image file, a text file, and the like has been performed (Step S2). When judged that a file readout operation has not been performed, the control section 1 judges whether or not a touch operation (including a slide operation) has been performed on the touch screens TD1 and TD2 (Step S8). When judged that a touch operation has not been performed, the control section 1 judges whether or not another operation has been performed (Step S15). When judged that another operation has been performed (YES at Step S15), the control section 1 performs, for example, processing for attaching a mark onto a text file or the like in response to the actuation of a bookmark function, as processing corresponding to the operation (Step S16), and then returns to the above-described Step S2.

At Step S2, when judged that a file readout operation has been performed (YES at Step S2), the control section 1 acquires a detection result from the orientation detecting section 7 and judges whether or not the terminal casing is vertically oriented (Step S3) When judged that the terminal casing is in the vertically oriented state shown in FIG. 2A (YES at Step S3), the control section 1 judges whether or not the display contents are vertically written (Step S4). Here, when judged that the terminal casing is in the vertically oriented state shown in FIG. 2A and the display contents are vertically written from top to bottom (YES at Step S4), the control section 1 performs display control to start writing the display information of a first page from the upper right corner of the touch screen TD2 on the right side and to start writing the display information of a second page from the upper right corner of the touch screen TD1 on the left side (Step S5).

When judged that the terminal casing is in the vertically oriented state shown in FIG. 2A and the display contents are horizontally written from left to right (NO at Step S4), the control section 1 performs display control to start writing the display information of the first page from the upper left corner of the touch screen TD1 on the left side and start writing the display information of the second page from the upper left corner of the touch screen TD2 on the right side (Step S6). Conversely, when judged at Step S3 that the terminal casing is in the horizontally oriented state shown in FIG. 2B (NO at Step S3), the control section 1 performs display control to start writing the display information of the first page from the upper right corner of the touch screen TD1 on the upper side for vertical writing or from the upper left corner of the touch screen TD1 on the upper side for horizontal writing, and start writing the display information of the second page from the upper right corner of the second touch screen TD2 on the lower side for vertical writing or from the upper left corner of the second touch screen TD2 on the lower side for horizontal writing (Step S7). Then, the control section 1 returns to the above-described Step S2.

When judged at Step S8 that a slide operation has been performed on the touch screens TD1 and TD2 (YES at Step S8), the control section 1 identifies the orientation of the terminal casing based on a detection result from the orientation detecting section 1 (Step S9). Next, the control section 1 identifies the type of the touch operation performed on the touch screens TD1 and TD2 as single touch or multi-touch (Step S10) and identifies whether the slide operation has been performed in the forward direction or in the backward direction (Step S11). Furthermore, the control section 1 identifies whether or not another screen is present in the sliding direction (Step S12). Then, the control section 1 references the operation table TB based on the orientation of the terminal casing, single touch/multi-touch, forward direction/backward direction, and presence/absence of another screen which have been identified as above (Step S13), and after performing display control based on the contents of the operation table TB (Step S14), returns to the above-described Step S2.

Next, display control (Step S15) based on the contents of the operation table TB will be described in detail with reference to the specific examples in FIG. 3A to FIG. 3E. Here, the display control stored in the operation table TB is basically similar regardless of whether the terminal casing is horizontally oriented or vertically oriented. Therefore, display control in the horizontally opened state (vertically oriented state) will be described, and descriptions of display control in the vertically opened state (horizontally oriented state) will be omitted.

First, as shown in FIG. 3B, an instance will be described in which a slide operation is performed from the left end of the touch screen TD2 towards the right (forwarding operation by single touch) with the information of a second page being displayed on the touch screen TD1 and the information of the first page being displayed on the touch screen TD2. First, the touch screen TD2 is identified as a screen on which a slide operation has been performed (operation screen), and the direction in which the slide operation has been performed from the operation screen is identified. Next, whether or not another screen is present in the sliding direction from the operation screen is judged, and then display control based on the judgment result is performed on the touch screens TD1 and TD2.

In this instance, the sliding direction in FIG. 3B is the right-hand direction, and another screen is not present in the right-hand direction (sliding direction). Accordingly, display control instructing the touch screens TD1 and TD2 to perform page turning by an amount equivalent to a single screen (page turning in the forward direction) is performed. As a result, the display contents on the touch screens TD1 and TD2 are forwarded by a single page such that the information of the third page is displayed on the touch screen TD1 and the information of the second page is displayed on the touch screen TD2. Next, in this state, when a slide operation in the right-hand direction is performed on the touch screen TD2 (forward scrolling operation by single touch), or in other words, when a slide operation similar to the above-described first slide operation is performed, page turning by an amount equivalent to a single page is performed on the display contents of the touch screens TD1 and TD2 in response to this second slide operation, as in the case of the first slide operation. As a result, the information of the fourth page is displayed on the touch screen TD1 and the information of the third page is displayed on the touch screen TD2.

In the above-described example, a case is described in which a forward scrolling operation by single touch is performed. However, a basically similar display control is performed when a backward scrolling operation by single touch is performed (operation in the left-hand direction). As shown in FIG. 3B, when a slide operation in the left-hand direction is performed on the touch screen TD1 with the information of the fourth page being displayed on the touch screen TD1 and the information of the third page being displayed on the touch screen TD2, the touch screen TD1 is identified as a screen on which a slide operation has been performed (operation screen). Then, because another screen is not present in the left-hand direction (sliding direction) from the operation screen, display control instructing the touch screens TD1 and TD2 to perform page turning by an amount equivalent to a single screen (page turning in the backward direction) is performed. As a result, the information of the third page is displayed on the touch screen TD1 and the information of the second page is displayed on the touch screen TD2.

Next, in this state, when a slide operation in the left-hand direction is performed on the touch screen TD1 (backward scrolling operation by single touch), or in other words, when a slide operation similar to the above-described first slide operation is performed, page turning by an amount equivalent to a single page is performed on the display contents of the touch screens TD1 and TD2 in response to this second slide operation, as in the case of the first slide operation. As a result, the information of the second page is displayed on the touch screen TD1 and the information of the first page is displayed on the touch screen TD2.

As shown in FIG. 3C, when a slide operation is performed from the left end of the touch screen TD1 towards the right-hand direction (forwarding operation by single touch) with the information of the second page being displayed on the touch screen TD1 and the information of the first page being displayed on the touch screen TD2, because the touch screen TD2 (another screen) is present in the right-hand direction (sliding direction) from the touch screen TD1 (operation screen), display control instructing the touch screens TD1 and TD2 to perform page turning by a number of pages calculated by the number of other screens present in the sliding direction being added to the number of the operation screen is performed. In this instance, the number of other screens present in the sliding direction is "1", and therefore the number of pages, which is the sum of the number of other screens "1" and "1", is "2". Accordingly, the touch screens TD1 and TD2 perform page turning by two pages. As a result of the display contents on the touch screen TD1 and TD2 each being forwarded by two pages, the information of the fourth page is displayed on the touch screen TD1 and the information of the third page is displayed on the touch screen TD2.

Next, in this state, when a slide operation in the right-hand direction is performed on the touch screen TD1 (forward scrolling operation by single touch), or in other words, when a slide operation similar to the above-described first slide operation is performed, page turning by an amount equivalent to two pages is performed on the display contents on the touch screens TD1 and TD2 in response to this second slide operation, as in the case of the first slide operation. As a result, the information of the sixth page is displayed on the touch screen TD1 and the information of the fifth page is displayed on the touch screen TD2.

In the above-described example, a case is described in which a forward scrolling operation by single touch is performed. However, a basically similar display control is performed when a backward scrolling operation by single touch is performed (operation in the left-hand direction). As shown in FIG. 3C, when a slide operation in the left-hand direction is performed on the touch screen TD2 with the information of the sixth page being displayed on the touch screen TD1 and the information of the fifth page being displayed on the touch screen TD2, because the touch screen TD1 is present as another screen in the left-hand direction (sliding direction) from the touch screen TD2 (operation screen), page turning by a number of pages calculated by the number of other screens being added to the number of the operation screen is performed on the touch screens TD1 and TD2. As a result, the information of the fourth page is displayed on the touch screen TD1 and the information of the third page is displayed on the touch screen TD2.

Next, in this state, when a slide operation in the left-hand direction is performed on the touch screen TD2 (backward scrolling operation by single touch), or in other words, when a slide operation similar to the above-described first slide operation is performed, page turning by an amount equivalent to two pages is performed on the display contents on the touch screens TD1 and TD2 in response to this second slide operation, as in the case of the first slide operation. As a result, the information of the second page is displayed on the touch screen TD1 and the information of the first page is displayed on the touch screen TD2.

FIG. 3D and FIG. 3E show the contents of screens on which a plurality of slide operations have been simultaneously performed using two fingers (multi-touch slide operation). The display control shown in FIG. 3D and FIG. 3E respectively correspond to the display control shown in FIG. 3B and FIG. 3C. That is, FIG. 3D is a diagram for explaining display control that is performed when a plurality of slide operations are performed (multi-touch operation) and another screen is not present in the sliding direction. FIG. 3E is a diagram for explaining display control that is performed when another screen is present in the sliding direction. In this instance, when display control (page turning) corresponding to a first slide operation is performed, automatic page turning is performed after the elapse of a predetermined amount of time. This predetermined amount of time is, for example, five seconds when the display information is images, and five minutes when the display information is text.

As shown in FIG. 3D, when a multi-touch slide operation is performed and another screen is not present in the sliding direction, page turning similar to that performed in response to the above-described first slide operation in FIG. 3B is performed, and then automatic page turning is performed after the elapse of a predetermined amount of time. As a result, the same contents as that of when the second slide operation is performed in the above-described FIG. 3B are displayed. Note that a similar display control is also performed when a backward scrolling operation is performed, in addition to when a forward scrolling operation is performed. Conversely, as shown in FIG. 3E, when a multi-touch slide operation is performed and another screen is present in the sliding direction, page turning similar to that performed in response to the above-described first slide operation in FIG. 3C is performed, and then automatic page turning is performed after the elapse of a predetermined amount of time. As a result, the same contents as that of when the second slide operation is performed in the above-described FIG. 3C are displayed. Note that a similar display control is also performed when a backward scrolling operation is performed, in addition to when a forward scrolling operation is performed.

In FIG. 3D to FIG. 3E, examples are described in which a plurality of slide operations are performed using two fingers simultaneously (multi-touch slide operation). However, the number of fingers simultaneously used to perform slide operations may be three or more. In this instance, the predetermined amount of time for automatically performing a second and later display control may be changed depending on the number of fingers used for the operation. For example, in a case where three fingers are used, the predetermined amount of time may be changed to seven seconds when the display information is images and to seven minutes when the display information is text.

As described above, when a slide operation is performed on the plurality of touch screens TD1 and TD2, the control section of the embodiment performs display control based on a judgment result regarding whether or not another screen is present in the sliding direction. Accordingly, a suitable display control of a plurality of touch screens can be actualized through simple and intuitive operations, and therefore it is practically useful.

In addition, when a slide operation is performed with display information amounting to a plurality of pages being assigned and displayed in page sequence on the touch screens, the control section 1 sequentially performs page turning on all the display information on the touch screens, as display control corresponding to the slide operation. Therefore, page turning by an amount equivalent to a plurality of touch screens can be collectively performed by a single slide operation, without a page turning operation for each touch screen being performed. Accordingly, the operability of the device can be significantly improved, and the continuity of pages between each screen can be ensured.

Moreover, when another screen is not present in a sliding direction, the control section 1 performs display control instructing the screens to perform page turning by an amount equivalent to a single screen. When another screen is present, the control section 1 performs display control instructing the screens to perform page turning by a number of pages calculated by the number of other screens present in the sliding direction being added to the number of the operation screen. Therefore, the number of pages to be turned can be changed simply through differences in a simple and natural operation.

Furthermore, when a plurality of slide operations are simultaneously performed, the control section 1 repeatedly and continuously performs display control by a number of times corresponding to the number of the operations at predetermined time intervals. Therefore, automatic page turning can be performed by merely making a little and natural difference in operation. That is, the control of a plurality of touch screens can be automatically performed by a single slide operation, and the operability of the device can be further significantly improved thereby.

Still further, the touch screens TD1 and TD2 are constituted by a plurality of independent display sections 5. Therefore, regardless of whether or not the display sections 5 are far from each other in terms of distance, display control corresponding to a slide operation can be performed on the touch screens which include a screen related to the screen on which the slide operation has been performed.

Figure 7A:
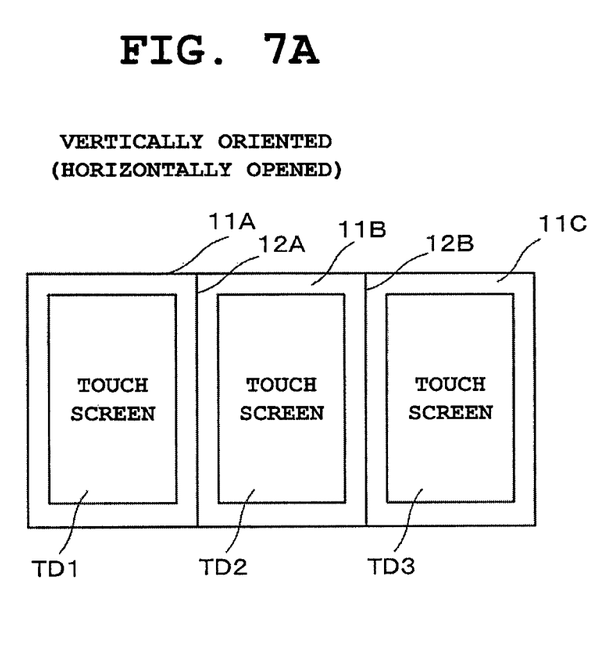
FIG. 7A and FIG. 7B are diagrams of a variation example of the embodiment, in which outer appearance views of three touch screens TD1, TD2, and TD3 in an opened state are shown.
Figure 7B:
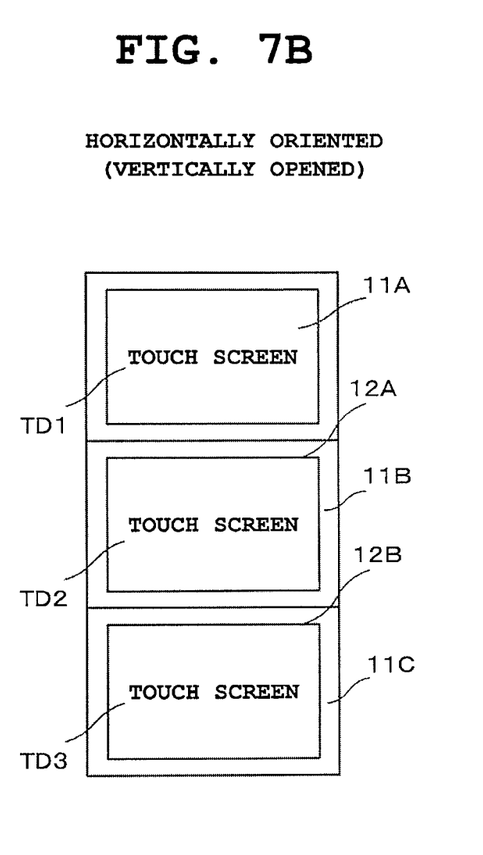

In the above-described embodiment, an example is described in which the two touch screens TD1 and TD2 are arranged as its plurality of screens. However, the number of touch screens may be three or more, and the way these touch screens are arranged may be determined discretionarily. For example, FIG. 7A and FIG. 7B show an example in which three touch screens TD1, TD2, and TD3 are aligned side-by-side. Three rectangular casings 11A, 11B, and 11C are foldably (openably and closably) connected by hinge sections 12A and 12B, and the touch screens TD1, TD2, and TD3 of the same shape and size (rectangular) are arranged on substantially the entire area on the inner surface side of the casings 11A, 11B, and 11C, respectively.

FIG. 7A shows a state in which the three rectangular casings 11A, 11B, and 11C are opened to be horizontally aligned (horizontally opened state), or in other words, a state in which the three rectangular casings 11A, 11B, and 11C are vertically oriented such that the overall terminal casing is horizontally long. In this vertically oriented state (horizontally opened state), the three touch screens TD1, TD2, and TD3 are in a horizontally aligned state (horizontally opened state) near each other (side-by-side). In this instance, as shown in FIG. 7A, an arrangement state is formed in which the touch screen TD1 is positioned on the left side, the touch screen TD2 is positioned in the center, and the touch screen TD3 is positioned on the right side.

FIG. 7B shows a state in which the overall terminal casing is rotated by 90 degrees from the state shown in FIG. 7A, and the three horizontally long casings 11A, 11B, and 11C are opened to be vertically aligned (vertically opened state), or in other words, a state in which the three horizontally long casings 11A, 11B, and 11C are horizontally oriented such that the overall terminal casing is vertically long. In the horizontally oriented state (vertically opened state), the three touch screens TD1, TD2, and TD3 are in a vertically aligned state (vertically opened state) near each other (side-by-side). In this instance, as shown in FIG. 7B, an arrangement state is formed in which the touch screen TD1 is positioned on the upper side, the touch screen TD2 is positioned in the center, and the touch screen TD3 is positioned on the lower side.

Figure 8A:
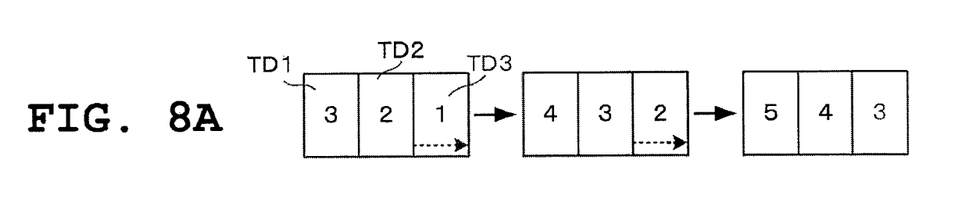
FIG. 8A to FIG. 8C are diagrams for explaining display control that are, when a slide operation is performed on the three touch screens TD1, TD2, and TD3 in a horizontally opened state (vertically held state), performed in response to this slide operation.

As in the case of the above-described FIG. 3A to FIG. 3C, FIG. 8A to FIG. 8C are diagrams for explaining display control performed in response to a slide operation when this slide operation is performed on the touch screens TD1, TD2, and TD3 with display information amounting to a plurality of pages being assigned and displayed in page sequence on the three touch screens TD1, TD2, and TD3 in the horizontally opened state (vertically oriented state), or in other words, with the information of a third page being displayed on the touch screen TD1, the information of the second page being displayed on the touch screen TD2, and the information of the first page being displayed on the touch screen TD3. FIG. 8A shows an instance in which a forward scrolling operation (slide operation) by single touch is performed within the area of the touch screen TD3, and the sliding direction is the right-hand direction as in the above-described FIG. 3B. In this instance, because another screen is not present in the sliding direction (right-hand direction), display control instructing the touch screens TD1, TD2, and TD3 to perform page turning by an amount equivalent to a single screen (page forwarding) is performed.

As a result of this display control, the information of the fourth page is displayed on the touch screen TD1, the information of the third page is displayed on the touch screen TD2, and the information of the second page is displayed on the touch screen TD3. Next, in this state, when a forward scrolling operation by single touch is performed in the right-hand direction on the touch screen TD3, page turning by a single page is performed as in the case of the first slide operation. As a result, the information of the fifth page is displayed on the touch screen TD1, the information of the fourth page is displayed on the touch screen TD2, and the information of the third page is displayed on the touch screen TD3.

Figure 8B:
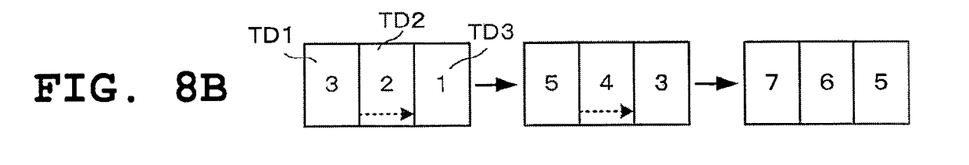

FIG. 8B shows an instance in which a forward scrolling operation by single touch is performed within the area of the touch screen TD2. In this instance, because another screen is present in the sliding direction (right-hand direction) as in the above-described FIG. 3C, page turning by a number of pages calculated by the number of this another screen (one screen) being added to the number of the operation screen is performed (1+1 pages). As a result, as shown in FIG. 8B, the information of the fifth page is displayed on the touch screen TD1, the information of the fourth page is displayed on the touch screen TD2, and the information of the third page is displayed on the touch screen TD3. Next, in this state, when a slide operation similar to the first slide operation is performed on the touch screen TD2, the information of the seventh page is displayed on the touch screen TD1, the information of the sixth page is displayed on the touch screen TD2, and the information of the fifth page is displayed on the touch screen TD3, as a result of this second slide operation.

Figure 8C:
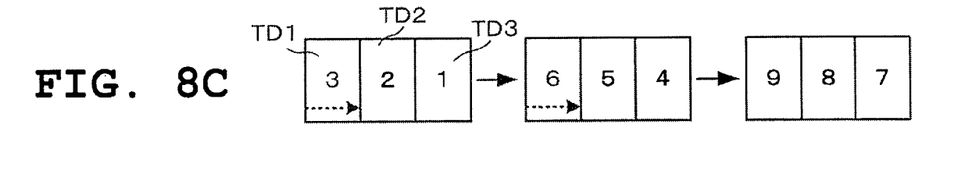

FIG. 8C shows an instance in which a forward scrolling operation by single touch is performed in the area of the touch screen TD1. In this instance as well, because other screens are present in the slide direction (right-hand direction) as in the above-described FIG. 3C, page turning by a number of pages calculated by the number of other screens (two screens) being added to the number of the operation screen is performed (2+1 pages). As a result, as shown in FIG. 8C, the information of the sixth page is displayed on the touch screen TD1, the information of the fifth page is displayed on the touch screen TD2, and the information of the fourth page is displayed on the touch screen TD3. Next, in this state, when a slide operation similar to the first slide operation is performed on the touch screen TD1, the information of the ninth page is displayed on the touch screen TD1, the information of the eighth page is displayed on the touch screen TD2, and the information of the seventh page is displayed on the touch screen TD3, as a result of this second slide operation.

Note that, although FIG. 8A to FIG. 8C show display control that are performed when slide operations in the forward direction are performed, a basically similar display control is performed even when a slide operation in the backward direction is performed. Also note that FIG. 8A to FIG. 8C show display control that correspond to slide operations performed in the horizontally opened state (vertically oriented state), and display control that correspond to slide operations performed in the vertically opened state (horizontally oriented state) are basically similar thereto, wherefore descriptions thereof are omitted. As just described, similar effects as those achieved when two touch screens TD1 and TD2 are arranged can be achieved when the three touch screens TD1, TD2, and TD3 are arranged as described above.

Figure 9A:
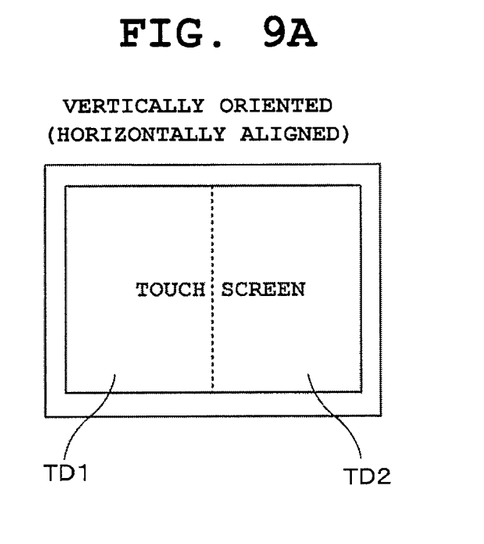
FIG. 9A to FIG. 9D are diagrams of a variation example of the embodiment, in which a single display section 5 has been divided to constitute a plurality of touch screens.
Figure 9B:
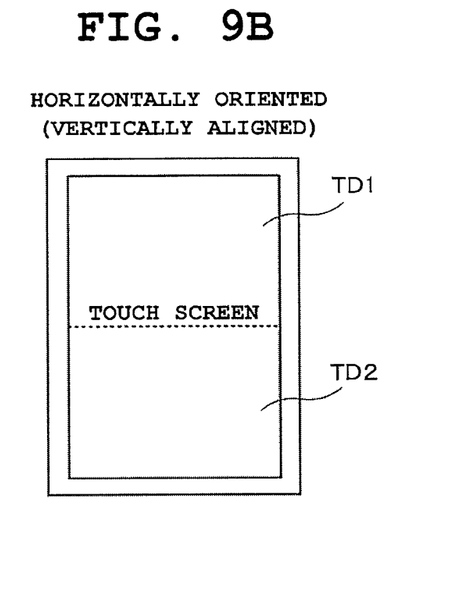
Figure 9C:
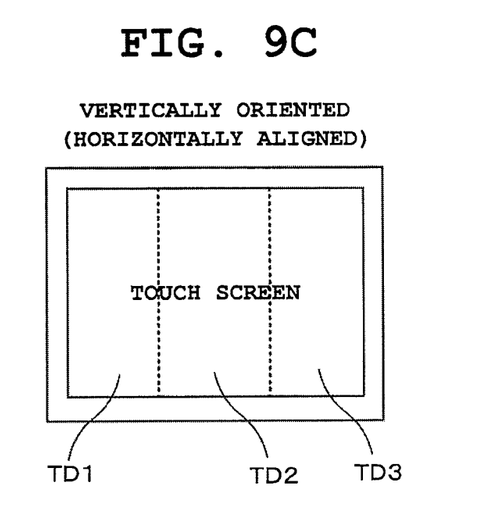
Figure 9D:
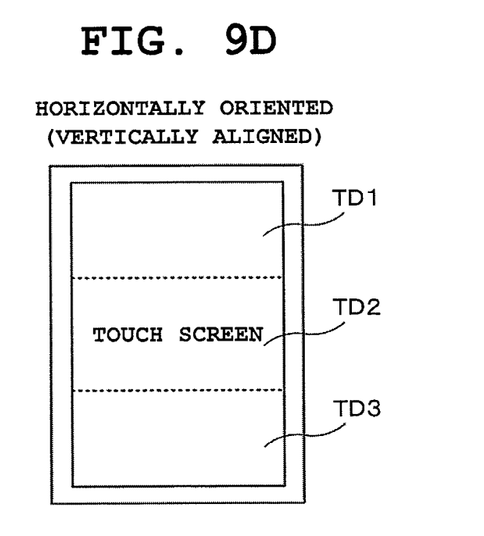

In the above-described embodiment, the touch screens TD1 and TD2 are constituted by a plurality of independent display sections 5. However, these touch screens TD1 and TD2 may be structured by a single display section 5 being divided. FIG. 9A to FIG. 9D show an example where the terminal device is a straight-type terminal device constituted by a single rectangular casing, in which a single display section 5 is provided on substantially the entire area of the casing. In the example, a plurality of touch screens (two or three screens) are configured by the single display section 5 being logically divided (using software). FIG. 9A and FIG. 9B show examples in which the single display section 5 is equally divided into two sections to constitute the touch screens TD1 and TD2, and FIG. 9C and FIG. 9D show examples in which the single display section 5 is equally divided into three sections to constitute the touch screens TD1, TD2, and TD3.

FIG. 9A shows a state in which the overall casing is horizontally long (vertically oriented), or in other words, a state when the two touch screens TD1 and TD2 are horizontally aligned. In this instance, the touch screen TD1 is positioned on the left side and the touch screen TD2 is positioned on the right side. FIG. 9B shows a state in which the overall casing is vertically long (horizontally oriented), or in other words, a state when the two touch screens TD1 and TD2 are vertically aligned. In this instance, the touch screen TD1 is positioned on the upper side, and the touch screen TD2 is positioned on the lower side. FIG. 9C shows a state in which the overall casing is horizontally long (vertically oriented), or in other words, a state when the three touch screens TD1, TD2, and TD3 are horizontally aligned. In this instance, the touch screen TD1 is positioned on the left side, the touch screen TD2 is positioned in the center, and the touch screen TD3 is positioned on the right side. FIG. 9D shows a state in which the overall casing is vertically long (horizontally oriented), or in other words, a state when the three touch screens TD1, TD2, and TD3 are vertically aligned. In this instance, the touch screen TD1 is positioned on the upper side, the touch screen TD2 is positioned in the center, and the touch screen TD3 is positioned on the lower side.

Since these plurality of touch screens are configured by the single display section 5 being logically divided as described above, display control corresponding to a slide operation can be performed on all the touch screens including a screen related to a screen on which a slide operation has been performed, even when each screen displays information independently.

In the above-described embodiment, an example is described in which a plurality of touch screens are arranged in an alignment. However, the arrangement is not limited thereto. The arrangement may be discretionarily determined, as described above. For example, the touch screens may be aligned in two rows or aligned in matrix form. In addition, the number of the touch screens may be four screens or more.

Moreover, in the above-described embodiment, when a slide operation is performed, page turning is performed in the sliding direction. However, this page turning may be performed in the direction opposite to the sliding direction. In addition, display control corresponding to the slide operation is not limited thereto, and may be the deletion of display information, etc.

Furthermore, in the above-described embodiment, slide operations are performed on a touch screen structured by a contact operating section (transparent touch sensor or touch panel) being layered over the display section 5. However, this slide operation performed on the screen is not limited to contact operation and may be non-contact operation. In this instance, if a non-contact sensor that detects the movement of an object present at a close distance by capacitance and the like is provided near the display section, the user is only required to move a finger in the space above the display section, whereby display control corresponding to a slide operation performed in the air becomes possible. This can be applied not only when a slide operation is performed on the display section, but also when the display section and the operating section are arranged far from each other in terms of distance.

Still further, the terminal device is not limited to a foldable type or a straight type, and may have an arbitrary casing structure such as a rotatable type. In addition, the terminal device is not limited to a mobile phone, and may be a personal computer, a personal digital assistant (PDA), a digital camera, a music player, etc.

In addition, the "devices" or the "units" described in the above-described embodiments are not required to be in a single casing, and may be separated into a plurality of casings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A terminal device having a plurality of screens, comprising:
   a slide operation detection means for detecting a slide operation performed on each of the plurality of screens;
   a judgment means for judging whether or not one or more screens other than an operation screen on which the slide operation is performed are present in a sliding direction from the operation screen when the slide operation is detected by the slide operation detection means; and
   a display control means for, in a state where display information amounting to a plurality of pages is assigned and displayed in page sequence on the plurality of screens, performing display control instructing the plurality of screens respectively to perform page turning by one page, when the judgment means judges that one or more screens are not present in the sliding direction from the operation screen, and performing display control instructing the plurality of screens respectively to perform page turning by a same number of pages as a number attained by adding one to a number of the one or more screens present in the sliding direction from the operation screen, when the judgment means judges that the one or more screens are present in the sliding direction from the operation screen, as a result of the judgment by the judgment means,
   wherein the judgment means judges whether or not two or more screens other than the operation screen on which the slide operation is performed are present in the sliding direction from the operation screen when the slide operation is detected by the slide operation detection means, and wherein the display control means performs display control instructing the plurality of screens respectively to perform page turning by a same number of pages as a number attained adding one to a number of the two or more screens present in the sliding direction from the operation screen, when the judgment means judges that the two or more screens are present in the sliding direction from the operation screen, as a result of the judgment by the judgment means.

2. The terminal device according to claim 1, wherein the slide operation detection means detects whether a single slide operation has been performed or a plurality of slide operations have been simultaneously performed, when detecting the slide operation performed on each screen; and the display control means repeatedly and continuously performs the display control by a number of times corresponding to the number of slide operations at predetermined time intervals, when the slide operation detection means detects that a plurality of slide operations have been simultaneously performed.

3. The terminal device according to claim 1, wherein the plurality of screens are constituted by a plurality of independent display sections.

4. The terminal device according to claim 1, wherein the plurality of screens are configured by a single display section being divided into a plurality of screens.

5. The terminal device according to claim 1, wherein the plurality of screens are touch screens structured by a touch panel being arranged on each screen; and the slide operation detection means detects a slide operation performed on each of the plurality of touch screens.

6. A non-transitory computer-readable storage medium having stored thereon a program that is executable by a computer, the program being executable by the computer to perform a process comprising:

processing for detecting a slide operation performed on each of a plurality of screens;

processing for judging whether or not one or more screens other than an operation screen on which the slide operation is performed present in a sliding direction from the operation screen when a slide operation is detected; and processing for, in a state where display information amounting to a plurality of pages is assigned and displayed in page sequence on the plurality of screens, performing display control instructing the plurality of screens respectively to perform page turning by one page, when judged that one or two and more screens are not present in the sliding direction from the operation screen, and performing display control instructing the plurality of screens respectively to perform page turning by a same number of pages as a number attained by adding one to a number of screens present in the sliding direction from the operation screen, when judged that one or two and more screens are present in the sliding direction from the operation screen, as a result of the judgment result, wherein the judging comprises judging whether or not two or more screens other than the operation screen on which the slide operation is performed are present in the sliding direction from the operation screen when the slide operation is detected, and wherein the processing comprises performing display control instructing the plurality of screens respectively to perform page turning by a same number of pages as a number attained by adding one to a number of the two or more screens present in the sliding direction from the operation screen, when judged that the two or more screens are present in the sliding direction from the operation screen, as a result of the judgment.

* * * * *